Patented June 6, 1950

2,510,496

UNITED STATES PATENT OFFICE 2,510,496

FURFURYLATED UREA RESINS AND METHOD OF PREPARATION

Frank J. Carlin, Jr., Saddle River, N. J., assignor to American Cyanamid Company, New York, N. Y., a corporation of Maine No Drawing. Application December 24, 1946, Serial No. 718,264

9 Claims. (Cl. 260—70)

This invention relates to the preparation of furfurylated urea resins. More particularly, the invention relates to the preparation of improved resins by reacting furfuryl alcohol with alkyl ethers of dimethylol urea.

Furfuryl alcohol has been found to impart many desirable properties to urea resins. When furfurylated urea resins are used as coating or film-forming compositions, the properties of toughness, hardness and adhesion are superior to those of the non-furfurylated urea resins. However, the preparation of the furfuryl alcohol-modified urea resins, which are suitable for use as film-forming compositions, as well as for other uses, such as in laminating processes and the like, is accomplished by numerous adverse characteristics. One of the undesirable characteristics is that of discoloration during the process of preparation. Another undesirable characteristic is the lack of stability of the prepared furfuryl alcohol-modified urea resins. Still another undesirable factor is the lack of compatibility of furfurylated resins with oil-modified alkyds.

An object of the present invention is to prepare improved furfuryl alcohol-modified urea resins.

Another object is to prepare furfurylated urea resins which are stable upon storage.

A further object is to prepare clear, light-colored furfurylated urea resins which are compatible with oil-modified alkyd resins.

A still further object is to prepare furfurylated urea resins which are soluble in organic solvents, such as methanol, iso-propanol, butanol, xylol, ethylene glycol ethers and the like.

According to the present invention, improved furfurylated urea resins are obtained by reacting furfuryl alcohol with one or more alkyl ethers of dimethylol urea in the presence of an alkaline catalyst, and optionally, partially polymerizing the resulting product in the presence of acid.

The following examples are given for the purpose of illustration and not in limitation. The term "parts" is used to express parts by weight, unless otherwise indicated.

Example 1

256 parts of urea resin "A"
196 parts of furfuryl alcohol
2.7 parts of a 5 N aqueous solution of sodium hydroxide The urea resin "A" and the furfuryl alcohol are charged into a suitable vessel equipped with an agitator and heated for about a half hour at about 100° C., followed by addition of the solution of sodium hydroxide. Heating is continued for about a half hour, and the batch is then allowed to distill at a vapor temperature of about 70–85° C. for a period of about one hour. The batch is then concentrated by heating at 130° C. under atmospheric pressure until the volatile liquids have been substantially removed. The resulting product is a clear, light-colored, viscous resin which is soluble in butanol, xylol, the methyl ether of ethylene glycol and the like.

Example 2

246 parts of di-methoxymethyl urea
196 parts of furfuryl alcohol
2.7 parts of a 5 N aqueous solution of sodium hydroxide The di-methoxymethyl urea and the furfuryl alcohol are charged into a suitable vessel equipped with an agitator and heated to about 70° C., followed by the addition of the solution of sodium hydroxide. The batch is refluxed at a temperature varying from about 95°–100° C. for about one hour. Distillation is then initiated and continued until the batch reaches a temperature of 130° C., and until no more distillate is obtained. A clear, light-colored, viscous resin remains.

Example 3

136.5 parts of dimethylol urea
275 parts of methyl alcohol
0.55 part of phthalic acid
7.4 parts of a 37% aqueous formaldehyde solution
1.8 parts of a 5 N aqueous solution of sodium hydroxide
98 parts of furfuryl alcohol The dimethylol urea, the methyl alcohol, the phthalic acid and the formaldehyde solution are charged into a suitable vessel equipped with an agitator and heated to reflux whereupon a clear solution results. The batch is then adjusted to a pH of about 7.7 with the sodium hydroxide solution and heated to about 100° C. to distill off the excess methanol and water. The furfuryl alcohol and 1.8 parts of a 5 N aqueous sodium hydroxide solution are added, and the batch is refluxed for about 2 hours. Distillation is then conducted to a final batch temperature of at least 130° C. under atmospheric pressure until all of the volatile materials are substantially removed. A clear, light-colored, viscous liquid is obtained which is cut with butanol to give a solution having a 70% solids content. One part of this solution is dilutable with up to two parts of xylol.

Example 4

819 parts of dimethylol urea
1650 parts of methanol
3.3 parts of phthalic acid
44.3 parts of a 37% aqueous formaldehyde solution
7.8 parts of a 5 N aqueous solution of sodium hydroxide
588 parts of furfuryl alcohol The dimethylol urea, the methanol, the phthalic acid and the formaldehyde solution are charged into a suitable vessel equipped with an agitator, and heated to reflux or until a clear solution is obtained. The mixture is adjusted to a pH of about 8.4 with a 5 N aqueous sodium hydroxide solution (about 9.6 parts being required), followed by distillation under a pressure of about 20 inches of mercury to a batch temperature of about 100° C. The furfuryl alcohol and the 7.8 parts of a 5 N aqueous solution of sodium hydroxide are added and refluxed for 2 hours. The product is concentrated by distilling to a final batch temperature of at least 130° C. under atmospheric pressure until no distillate is obtained. A light, clear resin remains, and it may be diluted to an 80% solids content with butanol.

Example 5

492 parts of di-methoxymethyl urea
392 parts of furfuryl alcohol
5.3 parts of a 5 N aqueous solution of sodium hydroxide The di-methoxymethyl urea and the furfuryl alcohol are charged into a suitable vessel equipped with an agitator and heated to about 90° C. The aqueous sodium hydroxide solution is added, and the batch is refluxed for about 2 hours. The mixture is distilled under atmospheric pressure at a batch temperature of 130° C., and further concentrated by distillation under a pressure of about 20 inches of mercury, the vapor temperature being about 90° C. A clear, light-colored liquid is obtained.

Example 6

135.5 parts of dimethylol urea
275 parts of methanol
0.55 part of phthalic acid
7.4 parts of a 37% aqueous formaldehyde solution
2.4 parts of a 5 N aqueous solution of sodium hydroxide
117.4 parts of furfuryl alcohol The dimethylol urea, the methanol, the phthalic acid and the aqueous formaldehyde solution are charged into a suitable vessel equipped with an agitator, and heated to reflux or until a clear solution is obtained. 1.8 parts of the 5 N aqueous sodium hydroxide solution are added, and the mixture is distilled at a batch temperature of 100° C. The furfuryl alcohol and 0.6 part of the sodium hydroxide solution are added, and the batch is refluxed for about 2 hours, followed by distillation at a temperature of 130° C. A clear liquid is obtained which is dilutable with butanol or the monoethyl ether of ethylene glycol.

Example 7

207 parts of furfurylated di-methoxymethyl urea prepared as in Example 4
0.21 part of sulfuric acid
1.6 parts of butanol The above materials are thoroughly mixed and heated for about 7 hours at a maximum temperature of about 94° C. The resulting polymerized furfurylated di-methoxymethyl urea has a viscosity of about 100 centipoises at a temperature of 25° C. One part of an 80% butanol solution of the polymerized product is dilutable with up to 2.6 parts of xylol which is somewhat higher than before the treatment given in accordance with this example.

Example 8

60 parts of polymerized furfurylated di-methoxymethyl urea prepared as in Example 7
40 parts of alkyd resin "A"
0.5 part of 100% sulfuric acid The above materials are thoroughly mixed to form a clear solution, and then applied in the form of films on wood and steel, followed by baking at about 140° F. for about 1 to 2 hours. The resulting film is clear, glossy, hard and shows goods adhesion and no brittleness.

Example 9

60 parts of furfurylated di-methoxymethyl urea from Example 4
40 parts of alkyd resin "A"
1 part of 88% sulfuric acid The above materials are thoroughly mixed to form a clear solution, and then applied to wood and steel surfaces in the form of films, followed by heating at about 140° F. for a period of 2 hours. The resulting films are clear, glossy, show good adhesion and no brittleness.

Example 10

50 parts of the furfurylated resin prepared in Example 6
40 parts of alkyd resin "B"
0.5 part of sulfuric acid The above materials are mixed and diluted to a 45% solids content with a 1:1 butanol-xylol solvent. The solution is sprayed on wooden panels and baked at 140° F. for about an hour, followed by a conventional method of sanding. Another coat of solution is sprayed over the sanded surface, and baked at 140° F. for about 2 hours. After rubbing and polishing, the film shows excellent properties of gloss, hardness, toughness and clarity. Other furfurylated products prepared according to the other examples may be substituted for the one used herein.

Preparation of urea resin "A"

100 parts of dimethylol urea
200 parts of methanol
0.5 part of oxalic acid

The above materials are charged into a vessel equipped with a stirrer and heated to reflux. After refluxing for about ¼ hour, the batch is treated with a 25% sodium hydroxide solution to give a pH of about 9. The batch is then concentrated by distilling at about 85° C. under a pressure of 7 inches of mercury.

Preparation of alkyd resin "A"

150 parts of castor oil
148 parts of phthalic anhydride
380 parts of glycerol

The above materials are charged into a vessel equipped with a stirrer and heated at 220° C. until an acid number of 10.5 is attained. The resin is diluted with xylol to give a solution having a 50% solids content and a viscosity of about 3000 centipoises at 25° C.

Preparation of alkyd resin "B"

120 parts of castor oil
148 parts of phthalic acid
98 parts of glycerol

The above materials are charged into a vessel equipped with a stirrer and heated at about 220° C. until an acid number of 8.5 is attained. The resin is then diluted with xylol to give a solution having a 40% solids content and a viscosity of about 2700 centipoises at 25° C.

The dimethyl ether of dimethylol urea used in the foregoing examples may be replaced in part or in all by other alkyl ethers wherein the alkyl groups contain less than 7 carbon atoms. Examples of some of these ethers are: di-n-butoxymethyl urea, mono-methoxymethyl urea, di-ethoxymethyl urea, di-amyloxymethyl urea, and the like. When the reaction is initiated by reacting dimethylol urea with an aliphatic alcohol, part or all of the alcohol may be likewise replaced by one or more aliphatic alcohols containing less than 7 carbon atoms. Examples of such alcohols are: ethyl alcohol, iso-propyl alcohol, propyl alcohol, n-butanol, iso-butanol, n-amyl alcohol, iso-amyl alcohol, n-hexanol, and the like.

The furfurylation may be accomplished under alkaline conditions by the use of alkaline catalysts, e. g., sodium hydroxide, potassium hydroxide, sodium carbonate or any of the organic bases, such as triethylamine, diethanolamine, triethanolamine, pyridine, and the like. The amount of catalyst used may vary within relatively wide ranges, but the catalyst is preferably kept within the range of about ½ to 5%, based on the combined weight of the alkyl ether of dimethylol urea and furfuryl alcohol. In addition, sufficient amounts of the alkaline catalyst may be added to neutralize any acid which may be present, as for example, that in the Formalin or that which may be used in the preparation of the alkyl ether of dimethylol urea when such is used.

The amount of furfuryl alcohol used to react with the alkyl ethers of dimethylol urea may vary widely, for example, from about one-tenth mol to about two mols of furfuryl alcohol per mol of the urea compound, the ratio being determined by the use to which the reaction product is to be directed. When the furfurylated urea resin is to be utilized as a coating or film-forming composition, optimum results are obtained by reacting from 1 to 1.25 mols of furfuryl alcohol per mol of the urea compound. It has been found that clear, stable products are consistently obtained by concentrating the furfurylated resin at a batch temperature of at least 130° C. Subsequent vacuum distillation at a batch temperature of about 100° C. under reduced pressure may be resorted to for a more complete removal of volatile materials. For other uses, such as in bonding or molding compositions, the amount of furfuryl alcohol may vary according to the properties which the final product is desired to have.

The curing catalysts most suitable for use in conjunction with the film-forming compositions of the present invention have been found to be strong acids, e. g., sulfuric acid, hydrochloric acid, phthalic acid, or salts of such acids, such as, for example, ammonium chloride, ammonium sulfate and aluminum chloride. When used in amounts varying from about ½ to 5% based on the weight of the resin, excellent results are obtained. It is preferable, however, to remain within the limits of ½ to 2% by weight of catalyst based on the weight of resin to impart optimum properties to the films.

The resin compositions of the present invention may be used in conjunction with other resins, such as alkylated and non-alkylated aminotriazine-formaldehyde resins, phenol-formaldehyde resins, resorcinol - formaldehyde resins, modified and unmodified alkyd resins, and the like.

My products may be used for molding or casting purposes in which case there may be incorporated various fillers, such as asbestos, glass fibres, cotton flock, silica, and the like. There may also be included various coloring pigments, such as titanium dioxide, chromic oxide, ferric oxide, and the like, as well as various plasticizers and lubricants. Curing catalysts, such as phthalic anhydride, a mixture of cis-endomethylene tetrahydro phthalic anhydride and para-toluene sulfonamide, and the like, may be incorporated into the compositions.

My products may be used as adhesives for paper, wood and other substances with or without fillers and extenders, such as cellulosic fillers, including wood flour, and with or without the customary acidic catalysts or the catalytic salts, such as ammonium chloride, ferric chloride, etc.

The compatibility of the resins of the present invention, obtained by reacting from 1 to 1.25 mols of furfuryl alcohol with alkyl ethers of dimethylol urea or with the partially polymerized alkyl ethers of dimethylol urea, with oil-modified alkyds gives rise to unique, clear, light-colored solutions and clear, light-colored, cured films. Such compatibility is of importance since unmodified alkyd resins do not impart sufficient flexibility to cured furfurylated urea resins for some specific uses. The alkyds suitable for use in conjunction with furfuryl alcohol-modified resins are those obtained by reacting a polycarboxylic acid with a polyhydric alcohol. The alkyd resins so prepared may then be modified with natural or synthetic non-drying or drying oils, such as castor oil, linseed oil, soya bean oil and the like, or the polycarboxylic acids and polyhydric alcohols may be reacted in the presence of a drying or non-drying oil. In place of the oils, the fatty acid constituents of such oils may be used, among which are: stearic, oleic, recinoleic, linoleic, myristic, capric and the like. Some of the polyhydric alcohols which may be used in the preparation of the alkyd resins are: glycol, diethylene glycol, pentaerythritol, sorbitol and the like. Among the suitable polybasic acids which may be used are: maleic, fumaric, succinic, adipic, sebacic and the like. The oil lengths of the alkyd resins used with the furfurylated urea resins may vary within a range of 75–150. The term "oil length" as used herein denotes parts by weight of oil per mol weight of dicarboxylic acid used in the preparation of the alkyd resins.

The alkyd resins and my furfurylated resins may be used in any desired proportions, for example, in weight ratios of 3:7 to 7:3.

As indicated in Example 7, products prepared by furfurylation of the dimethylol urea ethers may be partially polymerized, and the xylol or aromatic hydrocarbon tolerance increased by heating the furfurylated product at temperatures below 100° C. in the presence of an acidic catalyst, for example, any of the strong acids or acidic salts, including those mentioned as curing catalysts. The proportion thereof is preferably not

I claim:

1. A process for the preparation of a furfurylated alkyl urea ether resin comprising heating under alkaline conditions an alkyl ether of di-methylol urea with furfuryl alcohol in the presence of an alkaline catalyst, the alkyl of said ether having less than 7 carbon atoms.

2. A process for the preparation of a furfurylated alkyl urea ether resin comprising heating under alkaline conditions an alkyl ether of di-methylol urea with furfuryl alcohol in the presence of sodium hydroxide, the alkyl of said ether having less than 7 carbon atoms.

3. A process for the preparation of a furfurylated alkyl urea ether resin comprising heating under alkaline conditions di-methoxymethyl urea with furfuryl alcohol in the presence of an alkaline catalyst.

4. A process for the preparation of a furfurylated alkyl urea ether resin comprising heating under alkaline conditions a partially-polymerized alkylated dimethylol urea resin with furfuryl alcohol in the presence of an alkaline catalyst, the urea resin being alkylated with an aliphatic alcohol having less than 7 carbon atoms.

5. A process for the preparation of a light-colored, clear furfurylated alkyl urea ether resin comprising heating under alkaline conditions from 1 to 1.25 mols of furfuryl alcohol with one mol of an alkyl ether of dimethylol urea in the presence of an alkaline catalyst, the alkyl of said ether having less than 7 carbon atoms.

6. A process for the preparation of a light-colored, partially-polymerized furfurylated alkyl urea ether resin comprising heating a furfurylated urea resin prepared according to claim 1 at a temperature of less than 100° C. in the presence of less than one-half per cent by weight of an acidic catalyst.

7. A furfurylated alkyl urea ether resin prepared as in claim 3.

8. A light-colored, clear furfurylated alkyl urea ether resin prepared as in claim 5.

9. A partially-polymerized furfurylated urea resin prepared by heating under alkaline conditions an alkyl ether of dimethylol urea with furfuryl alcohol in the presence of an alkaline catalyst, the alkyl of said ether having less than 7 carbon atoms, then heating the resulting reaction product with an acidic catalyst at a temperature of less than 100° C. until the resin is partially polymerized, whereby the xylol tolerance of said reaction product is increased.

FRANK J. CARLIN, Jr.

REFERENCES CITED

The following references are of record in the file of this patent:

UNITED STATES PATENTS

| Number | Name | Date |
|--------|------|------|
| 2,197,357 | Widmer | Apr. 16, 1940 |
| 2,213,921 | Sorenson | Sept. 3, 1940 |
| 2,335,701 | Root | Nov. 30, 1943 |
| 2,386,744 | Myers | Oct. 9, 1945 |
| 2,397,451 | West | Mar. 26, 1946 |